United States Patent
Peng et al.

(10) Patent No.: US 10,283,152 B1
(45) Date of Patent: May 7, 2019

(54) NEAR-FIELD TRANSDUCER WITH A DIELECTRIC SLIT AT INTERNAL SURFACES FOR CONTROLLING FEEDBACK TO A LIGHT SOURCE

(71) Applicant: Seagate Technology LLC, Cupertino, CA (US)

(72) Inventors: Chubing Peng, Eden Prairie, MN (US); James Gary Wessel, Savage, MN (US); Lien Lee, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/006,324

(22) Filed: Jun. 12, 2018

Related U.S. Application Data (60) Provisional application No. 62/521,033, filed on Jun. 16, 2017.

(51) Int. Cl.
| | |
|---|---|
| *G11B 11/00* | (2006.01) |
| *G11B 5/48* | (2006.01) |
| *G11B 5/00* | (2006.01) |
| *G11B 13/08* | (2006.01) |
| *G11B 5/60* | (2006.01) |
| *G11B 7/12* | (2012.01) |
| *G11B 11/24* | (2006.01) |

(52) U.S. Cl.
CPC .......... *G11B 5/4866* (2013.01); *G11B 5/6088* (2013.01); *G11B 7/12* (2013.01); *G11B 11/24* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,169,881 B2 | 5/2012 | Balamane et al. | |
| 8,605,556 B1 * | 12/2013 | Peng | G11B 5/314 |
| | | | 369/13.13 |
| 8,959,668 B1 | 2/2015 | Peng et al. | |
| 9,053,722 B1 * | 6/2015 | Burgos | G11B 5/3133 |
| 9,196,269 B2 | 11/2015 | Cao et al. | |
| 9,280,989 B2 | 3/2016 | Pitcher et al. | |
| 9,418,691 B2 | 8/2016 | Peng et al. | |
| 9,502,069 B2 | 11/2016 | Peng et al. | |
| 9,911,441 B1 * | 3/2018 | Jandric | G11B 5/314 |
| 9,960,570 B1 * | 5/2018 | Goggin | H01S 5/14 |
| 10,032,468 B1 * | 7/2018 | Wessel | G11B 5/3133 |

(Continued)

*Primary Examiner* — Tan X Dinh
(74) *Attorney, Agent, or Firm* — Hollingsworth Davis, LLC (57) ABSTRACT

A recording head includes a waveguide configured to deliver light from a light source to a media-facing surface of the recording head. A near-field transducer is at the media-facing surface the proximate the waveguide. The near-field transducer includes a plasmonic structure with at least two opposing internal surfaces. A dielectric material fills a region between the at least two opposing internal surfaces. A dielectric slit extends between the at least two opposing internal surfaces. The dielectric slit is substantially parallel to the media-facing surface and includes a transparent material with a refractive index different than that of the dielectric material.

20 Claims, 8 Drawing Sheets

(56) References Cited

U.S. PATENT DOCUMENTS

| | | | |
|---|---|---|---|
| 2009/0116804 A1* | 5/2009 | Peng | G11B 5/314 |
| | | | 385/131 |
| 2010/0165822 A1 | 7/2010 | Balamane et al. | |
| 2013/0064051 A1* | 3/2013 | Peng | G11B 5/3133 |
| | | | 369/13.33 |
| 2013/0064502 A1* | 3/2013 | Peng | G11B 5/6088 |
| | | | 385/31 |
| 2013/0071062 A1* | 3/2013 | Peng | G11B 5/314 |
| | | | 385/31 |
| 2014/0355399 A1* | 12/2014 | Huang | G11B 5/3133 |
| | | | 369/13.17 |
| 2015/0003218 A1* | 1/2015 | Peng | G11B 5/4866 |
| | | | 369/13.17 |
| 2015/0235658 A1 | 8/2015 | Cao et al. | |
| 2016/0293189 A1* | 10/2016 | Yang | G02B 6/126 |

* cited by examiner

FIG. 11

NEAR-FIELD TRANSDUCER WITH A DIELECTRIC SLIT AT INTERNAL SURFACES FOR CONTROLLING FEEDBACK TO A LIGHT SOURCE

RELATED APPLICATIONS

This application claims the benefit of Provisional Patent Application Ser. No. 62/521,033 filed on Jun. 16, 2017 and which is hereby incorporated herein by reference in its entirety.

SUMMARY

The present disclosure is directed to a near-field transducer with features and one or more internal surfaces that control feedback to a light source. In one embodiment, a recording head includes a waveguide configured to deliver light from a light source to a media-facing surface of the recording head. A near-field transducer is at the media-facing surface the proximate the waveguide. The near-field transducer includes a plasmonic structure with at least two opposing internal surfaces. A dielectric material fills a region between the at least two opposing internal surfaces. A dielectric slit extends between the at least two opposing internal surfaces. The dielectric slit is substantially parallel to the media-facing surface and includes a transparent material with a refractive index different than that of the dielectric material.

In another embodiment, a recording head includes a waveguide configured to deliver light from a light source to a media-facing surface of the recording head. A near-field transducer is at the media-facing surface the proximate the waveguide. The near-field transducer includes a plasmonic structure surrounding an aperture that is filled with a dielectric material. An internal wall of the aperture includes a structure with two surfaces substantially parallel to the media-facing surface. The structure controls reflection of the light to the light source.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer, which raises the media temperature locally, reducing the writing magnetic field required for high-density recording.

The laser diode used in a HAMR recording head is an open resonator, for instance, an edge-emitting laser diode. This type of device can be de-stabilized by returning light into the diode cavity, sometimes referred to as optical feedback. Optical feedback may cause laser instability, which behaves as optical output jump and dynamic intensity noise, resulting in magnetic transition sudden jump and jitters. Embodiments are described below that can reduce or eliminate optical feedback.

One way to control optical feedback is to use a reflector to cancel (or increase) the reflection from the NFT, the magnetic writer, and the recording media by interferometric method. There are many types of reflectors, such as a metallic cylinder in the bottom cladding layer, a distributed Bragg grating (DBR) at the core/cladding interface, and a waveguide splitter with one end terminated with a reflector. Effectiveness and impact on the recording performance of such reflectors depend on the reflector and NFT.

In embodiments described below, a dielectric feature in the NFT core is used to control optical feedback (e.g., light that returns into the laser cavity) for Fabry-Perot laser mode stability. This type of dielectric feature can be used with different types of NFT, such as funnel and gap NFTs. The feedback could be eliminated such that the lasing mode is stabilized with the back and front facet coating. In other embodiments, feedback could be intensified such that the laser operates in an external cavity mode with an anti-reflective coating on a front facet of the diode.

Figure 1:
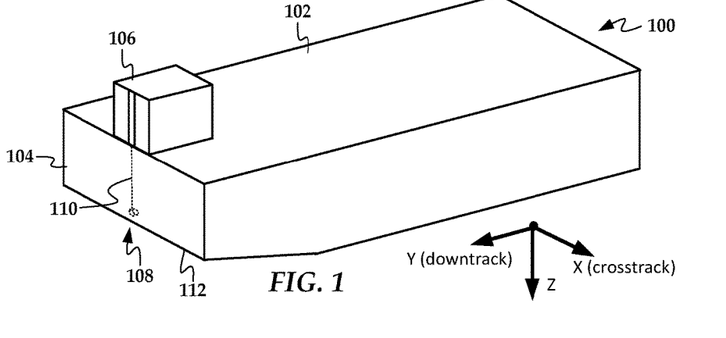
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording media (not shown), e.g., a magnetic disk.

The illustrated read/write head 100 is configured as a HAMR device, and so includes additional components that form a hot spot on the recording media near the read/write transducers 108. These HAMR components include a light source 106 (e.g., laser diode) and a waveguide 110. The waveguide 110 delivers electromagnetic energy from the energy source 106 to an NFT that is part of the read/write transducers 108. The NFT achieves surface plasmon resonance and directs the energy out of a media-facing surface 112 to create a small hot spot in the recording media.

There are a number of different types of NFTs. One type of NFT uses subwavelength metallic aperture or a gap to direct surface plasmons. Another type of NFT uses an optical antenna with a protruded tip (e.g., a peg extending from an enlarged portion). An NFT relies on the excitation of surface-plasmon at the interface between a plasmonic metal of free electrons and a dielectric material. Optical energy from the waveguide is squeezed into a local volume, field-line concentration occurs at a local shape singularity, such as a gap or a tip/peg, due to the collective oscillations of electrons in the metal, which increases the interaction between light and matter.

The laser diode functions as an open optical resonator. For a Fabry-Perot type edge-emitting laser diode, the resonator includes of a gain medium sandwiched between a back facet with a highly reflective coating and a front facet with a partially reflective coating. Light emits from the front facet. The resonator supports many longitudinal modes, determined by the phase condition. The mode that lases has the largest gain. Any change in, for instance, temperature at the diode junction and reflection (amplitude and/or phase) into the resonator might induce mode-hopping, causing large change in the light output and therefore, resulting in a sudden shift in magnetic transition.

For a HAMR drive, temperature at the diode junction will vary and may cause mode hopping to occur. One parameter that affects the recording due to mode hopping is the amount of change in the light output at the hopping, which is determined by the change in the net gain or loss, driven by the change in temperature. One way to minimize this change is to have negligible reflection (called feedback) into the laser cavity from the magnetic slider. In such a case, the lasing mode stability can be maintained by the back and front facet coating. Another way is to use reflection from the slider to function as a front facet while the front facet of the diode and the input surface of the slider is anti-reflection coated. This latter configuration is called external cavity laser.

In one configuration, a reflector integrated in the slider can be used to cancel the reflection from the near-field transducer, the magnetic writer, and the recording media by interferometric method. There are many types of reflectors, such as a metallic cylinder in the bottom cladding layer, called bottom-cladding-disc (BCD), a distributed Bragg grating (DBR) at the core/cladding interface, and a waveguide splitter with one end terminated with a reflector. Its effectiveness and impact on the recording performance depend on the reflector and near-field transducer.

Figure 2:
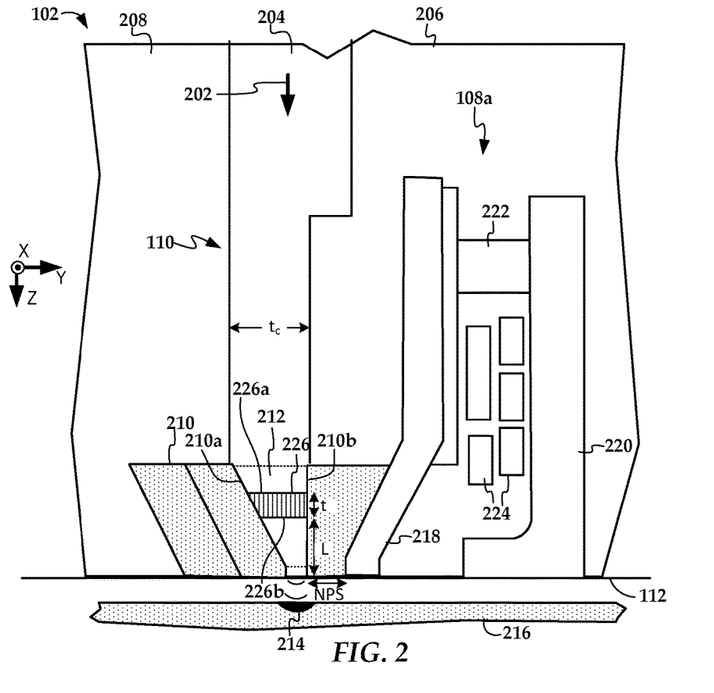
FIG. 2 is a cross-sectional view of a slider along a down-track plane according to according to an example embodiment.
Figure 3:
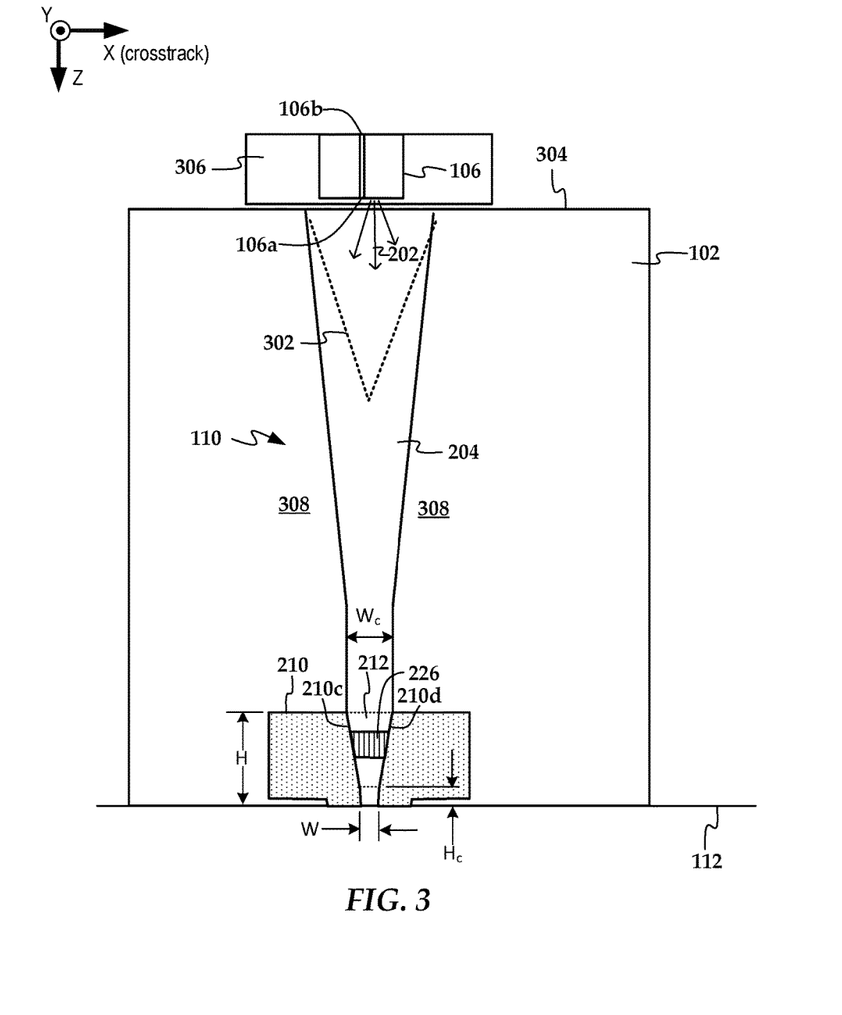
FIG. 3 is a wafer plane view of the slider shown in FIG. 2.

For aperture or gap type near-field transducer, a lossless dielectric material is tapered down to a small dimension and coated by a plasmonic material on at least two sides of the dielectric material, forming a plasmonic MIM (metal-isolator-metal) waveguide. The field inside the dielectric material is gradually concentrated to the gap or aperture. Making use of the peculiarity of the plasmonic waveguide, this invention discloses methods to obtain large feedback to achieve external cavity laser or have negligible feedback for lasing mode stability with little penalty in the NFT performance such as efficiency and thermal gradient. A dielectric slit can be used inside a funnel or gap near-field transducer to obtain large feedback desired for external cavity operation. In other embodiments, the dielectric slit can reduce or eliminate the feedback into the laser cavity with little penalty in the recording performance In reference now to FIGS. 2 and 3, cross-sectional views show details of a slider body 102 according to an example embodiment. As best seen in FIG. 3, light 202, is emitted from a front facet 106a of the light source 106 (e.g., laser diode) and coupled into a three-dimensional channel waveguide 110 of the slider body 102 by a waveguide input coupler 302. The laser 106 is attached to an input surface 304 of the slider body 102 via an optional submount 306.

The waveguide includes a core 204 and claddings—top cladding 206, bottom cladding 208, and side cladding 308.

The waveguide core 204 is made of dielectric materials of high index of refraction, for instance, $Ta_2O_5$ (tantalum oxide), $Nb_2O_5$ (niobium oxide), $Si_3N_4$ (silicon nitride), AlN (aluminum nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The cladding layers are each formed of a dielectric material having a refractive index lower than the core, be made of a material, for instance, $Al_2O_3$ (aluminum oxide), SiO and $SiO_2$ (silica). Near the media-facing surface 112, the waveguide core 204 is tapered down to a small dimension along the cross- and down-track direction.

Shown at the media-facing surface is a funnel (aperture) NFT 210. The NFT 210 is formed by surrounding a tapered core with a structure of plasmonic material (shaded regions). The plasmonic material has negative permittivity in its real part and low optical loss. Examples of plasmonic materials are Au, Ag, Cu, Au—Cu alloy, Au—Co alloy, Rh, Pd, Pt, Ir, etc. The core defines an aperture 212 that has a decrease in cross-sectional area as it extends toward the media-facing surface 112. The aperture 212 includes at least two opposing internal surfaces 210a-d (shown in both FIGS. 2 and 3). The opposing internal surfaces 210a-d need not have a distinct transition from one to the other. For example, a circular or oval aperture may have a continuous internal surface, and this surface may be arbitrarily divided into two internal surfaces that are opposed to (face) one another.

The light 202 is coupled into and squeezed through the aperture 212 surrounded by the surfaces 210a-d where surface plasmon polaritons are excited. The surface plasmon allows the light to be directed out of the aperture end toward the media-facing surface 112 which otherwise will be cut off, forming a hotspot 214 in a recording layer of the recording media 216. A magnetic writer 108a generates a magnetic field that changes magnetic orientation within the hotspot 214. The magnetic writer 108a includes a main pole 218, a return pole 220, a back via 222 and coils 224. The main pole 218 is adjacent one side of the NFT 210.

The magnetic writer 108a is energized by an electric current through the coils 224 to generate a magnetic field at the tip of the main magnetic pole 218. The magnetic field switches the magnetization direction of magnetic grains in the recording media 216 placed in a close proximity (10 nm or less) to the writer 108a and NFT 210. The return pole 220 and back via 220 form a flux return path that ensures the direction of the applied magnetic field is perpendicular to the media surface.

A dielectric slit 226 is formed inside the tapered aperture 212 of the NFT to control the return light (feedback) into the laser diode cavity. The slit 226 extends between the opposing internal surfaces 210a-d of the NFT 210 and has surfaces 226a-b that are substantially parallel (e.g., within 15 degrees) of the media-facing surface 112. The slit is made of a transparent dielectric material with an index of refraction different from (e.g., lower than) that of the core 204. If the aperture 212 is filled with a material different than the core 204, the refractive index of the slit 212 may be higher or lower than this material.

The thickness t of the slit 226 (see FIG. 2) could be chosen around a multiple of quarter-wavelengths, $m \lambda_0/(4 n_{\mathit{eff}})$, to maximize its effect. Here m=1, 3, 5, . . . , an odd integer, $\lambda_0$ denotes the light wavelength in free space, and $n_{\mathit{eff}}$ the effective mode index of a plasmonic waveguide with the slit as a core, which can be estimated as shown in Equation (1)

below, where n(slit) is the index of refraction of the slit material and $\varepsilon_m$ is the relative permittivity of the plasmonic surrounding.

$$n_{eff} = n(\text{slit}) \times \text{real part} \left[ \sqrt{\frac{\varepsilon_m}{\varepsilon_m + n(\text{slit})^2}} \right] \quad (1)$$

The slit position L (see FIG. 2) is determined by numerically computing the mode reflection from the NFT 210 and the storage media 216, which eventually returns to the laser diode cavity along the waveguide 110. At certain locations, this reflection is negligible, which will not induce mode hopping in the laser diode cavity, set by the reflective coating in back of the cavity and front facet of the cavity. At some other locations, the reflection is large, for instance, 10%, which supports an external cavity mode with the front-facet and the input surface of the slider anti-reflection coated. Generally, in an external cavity mode, the optical components (e.g., waveguide 110, active region of the light source 106, the NFT 210) between the media-facing surface 112 and a reflective end 106b of the light source 106 act as a resonant cavity that amplifies the light intensity until it reaches a threshold and emits via the NFT 210.

As an example, consider a waveguide formed of a $Ta_2O_5$ core and $Al_2O_3$ claddings (top, bottom, and side). The core is 920 nm wide along the cross-track direction and 340 nm thick along the down-track direction. The index of refraction (n) is 2.10 for the core, and 1.63 for the claddings. Light wavelength $\lambda$=830 nm. The funnel NFT 210 is H=964 nm long (see FIG. 3) from the media-facing surface 112 with a straight part Hc=20 nm. The plasmonic material is gold, having a complex refractive index n=0.188+i 5.39.

In this example, the aperture size at the media-facing surface 112 is W=60 nm along the cross-track and 15 nm along the down-track direction. The waveguide mode excited is a fundamental transverse magnetic (TM) mode with the dominant transverse electric (TE) field oriented along the down-track direction. The slit 226 for feedback control uses the same material as the cladding, $Al_2O_3$. The slit thickness is chosen at one-quarter of wavelengths in the material: $t=\lambda_0/(4 \, n(Al_2O_3))$=830 nm/(4×1.63)≈130 nm. The main pole 218 is sloped at 26° from the z-direction and the pole tip is 20-nm (NPS dimension in FIG. 2) from the NFT.

For this example, a storage media 216 is placed 8 nm below the media-facing surface 112. The storage media 216 includes a 12.6 nm thick FePt layer (complex refractive index n=3.06+i 1.7), a 10 nm thick MgO layer (n=1.70), and a 60 nm heat-sink layer (n=2.3+i 3.5) on a glass substrate. The head-media spacing assumes an effective index n=1.21. These parameters were used to perform a simulation, the results of which are shown in the graph of FIG. 4.

Figure 4:
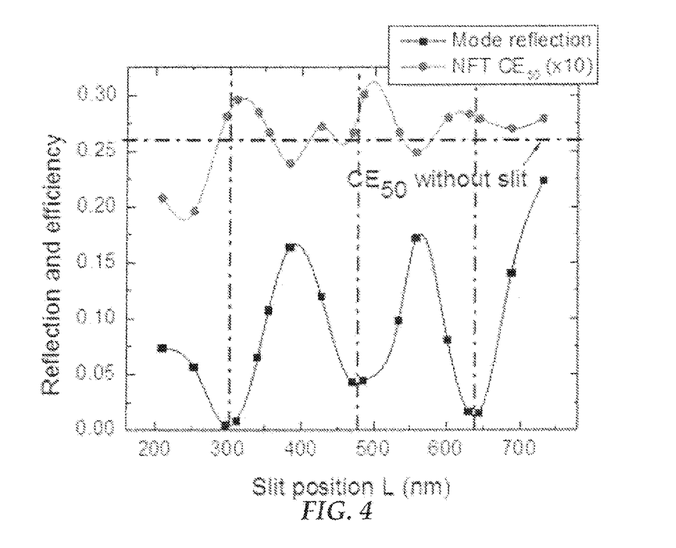
FIG. 4 is a graph showing simulation results of a near-field transducer as shown in FIGS. 2 and 3.

The graph in FIG. 4 shows the mode reflection and near-field transducer efficiency versus the distance of the slit from the media-facing surface. The mode reflection is an overlap integral between the reflection field (from the NFT, the magnetic writer, and the storage media) and the input waveguide mode field. The NFT efficiency, $CE_{50}$, is defined as the light absorption in the FePt layer in a foot print of 50 nm by 50 nm. For a funnel NFT 210, the thermal gradient for writing will not change with the present of the slit 226. As expected, the mode reflection oscillates with the slit position L. The oscillation period is about 174 nm, which is consistent with the expectation shown in Equation (2) below $$\frac{\lambda_0}{2n_{eff}} \approx \frac{\lambda_0}{2n(\text{core}) \times \text{real part} \left( \sqrt{\frac{n(\text{gold})^2}{n(\text{gold})^2 + n(\text{core})^2}} \right)} = 182 \text{ nm} \quad (2)$$

At some locations, the mode reflection is small; in particular, at L≈300 nm, the mode reflection is only ~0.2%, which will not induce mode hopping in the laser diode cavity set by the back and front facet coating. Near these locations, the NFT efficiency is greater than the case without a slit 226. There are also some locations with the mode reflection >15%, which can be used to operate the laser diode 106 in an external cavity mode when the front facet and the input surface of the slider are anti-reflection coated. At these positions, there usually has a small penalty (<10%) in the NFT efficiency. But if the slit is placed far enough away from the media-facing surface, there is little or no penalty in the NFT efficiency.

Figure 5:
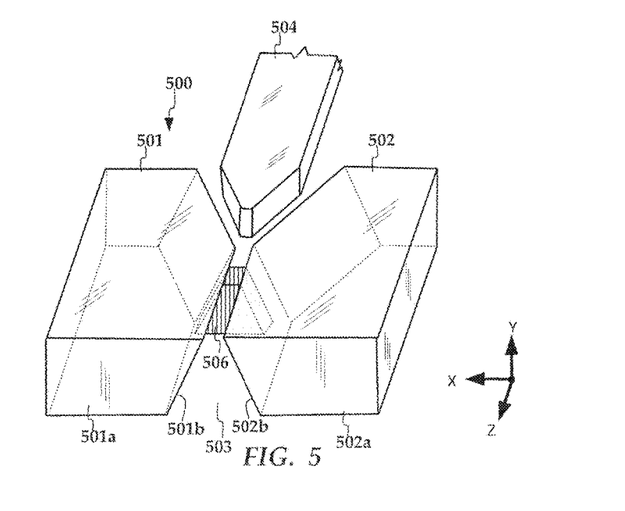
FIG. 5 is a perspective view of a gap near-field transducer according to another example embodiment.

While the above analysis was directed to a funnel-type NFT 210, a similar dielectric slit may be used with other NFT configurations. In FIG. 5, a perspective view shows an NFT 500 according to another example embodiment. The NFT is formed of two substrate-parallel plates 501, 502 with a gap 503 therebetween. The plates 501, 502 are formed of a plasmonic material as described above. Edges 501a, 502a of the plates 501, 502 are at or near the media-facing surface of a recording head.

A waveguide core 504 couples light to the NFT 500. Regions surrounding the core 504 and the plates 501, 502 including the gap area 502, are filled with one or more dielectric materials, e.g., top and/or bottom cladding materials. In some embodiments, the material of the core 504 may extend into the gap 503. A dielectric slit 506 is located within the gap 503 and extends between internal opposing surfaces 501b, 502b the plates 501, 502. The dielectric slit 506 may have similar geometric and refractive index properties as described for the slit 226 shown in FIGS. 2 and 3. The slit 506 may be placed anywhere along the z-direction, e.g., away from surfaces 501a, 501b to reduce impact on NFT efficiency.

Figure 6:
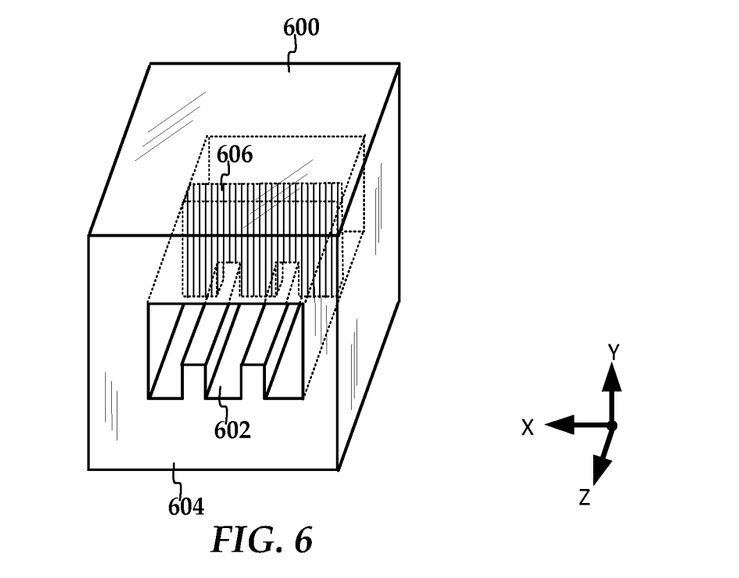
FIGS. 6 and 7 are perspective views of aperture near-field transducers according to other example embodiments.
Figure 7:
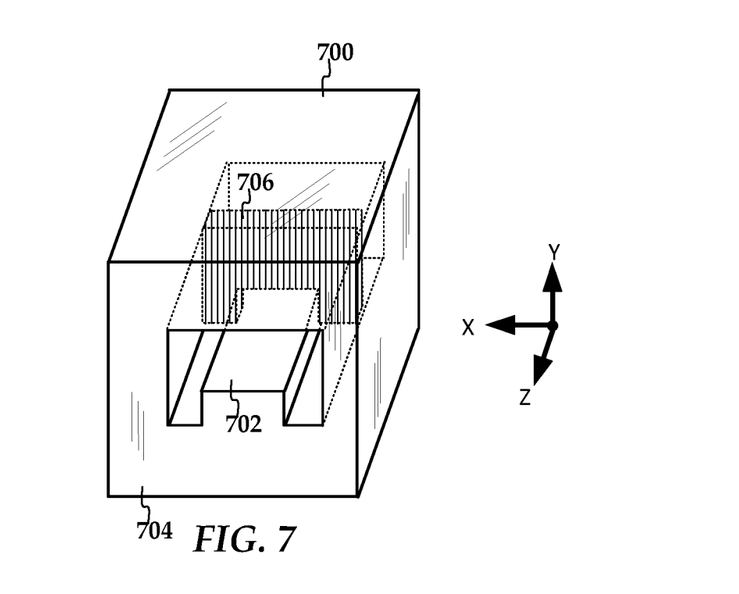

A dielectric slit similar to illustrated slits 506, 226 could also apply to other types of aperture NFTs. For example, FIGS. 6 and 7 are perspective views of aperture NFTs 600, 700 according to additional embodiments. The NFTs 600, 700 are formed of plasmonic materials with apertures 602, 702 running through the plasmonic materials in a light propagation direction (z-direction). Aperture 602 is an E-shaped aperture, and aperture 702 is a C-shaped aperture. Edges 604, 704 are at or near a media-facing surface of a recording head. The NFTs 660, 700 may be used with other components illustrated elsewhere herein, e.g., delivery waveguides, write transducers, etc. The outer contours of the NFTs 600, 700 may be different than seen here, and generally the NFTs 600, 700 and apertures 602, 702 are filled with a dielectric material. The NFTs 600, 700 include dielectric slits 606, 706 that extend between opposing internal surfaces in the apertures 602, 702. The slits may have similar geometric and refractive index properties as described for the slit 226 shown in FIGS. 2 and 3. The slits 606, 706 may be placed anywhere along the z-direction, e.g., away from surfaces 604, 704 to reduce impact on NFT efficiency.

Figure 8A:
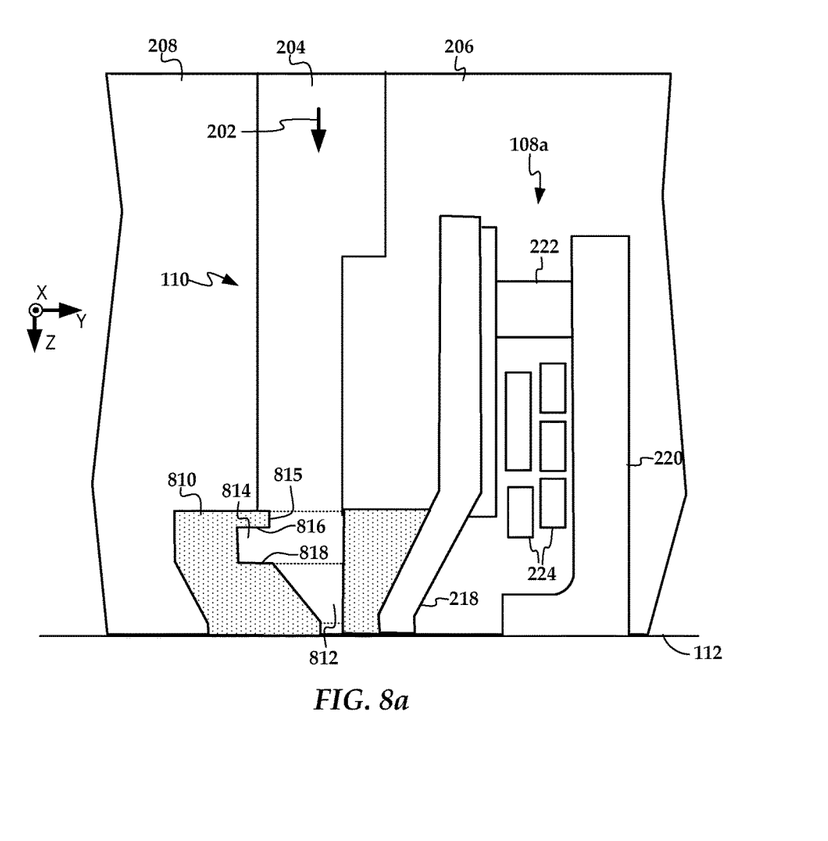
FIGS. 8*a*, 8*b*, and 9 are cross-sectional views of a slider along a down-track plane according to according to other example embodiments.

In other embodiments, a feature formed on the inner surface of the NFT can be used in addition to or instead of a dielectric slit to reduce optical feedback. Generally, the NFT feature includes two or more surfaces parallel (or at a small angle to, e.g., less than 15 degrees) the media-facing surface. An example embodiment of such an NFT is shown in the cross-sectional view of a recording head shown in FIG. 8a. Shown at the media-facing surface 112 is a funnel NFT 810. The NFT 810 has a tapered aperture 812 surrounding by a plasmonic material (shaded regions). The aperture 812 may be filled with a core and/or cladding dielectric material.

A cavity 814 is located in one internal wall 815 of the NFT 810. The cavity 814 locally increases the width of the aperture 812 and results in two surfaces 816, 818 of the internal wall 815 being substantially (e.g., within about 15 degrees) parallel to the media-facing surface 112. Generally, the cavity 814 reduces feedback to a laser that energizes the NFT 810 via delivery waveguide 110. A similar internal wall cavity can be used with other NFT embodiments, e.g., gap NFT 500 shown in FIG. 5 and aperture NFTs shown in FIGS. 6 and 7.

Figure 8B:
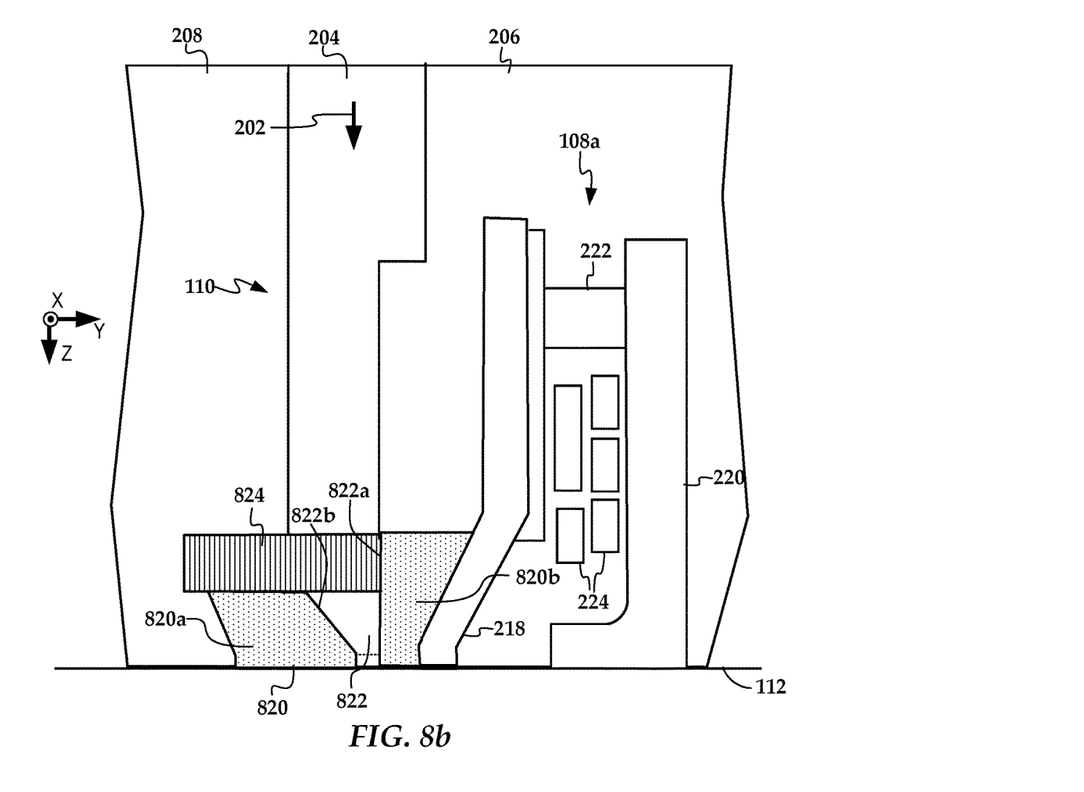

Another example embodiment is shown in the cross-sectional view of a recording head shown in FIG. 8b. Shown at the media-facing surface 112 is a funnel NFT 820. The NFT 820 has a tapered aperture 822 surrounding by a plasmonic material (shaded regions). The aperture 822 may be filled with a core and/or cladding dielectric material. The NFT 820 is asymmetric due to two opposing sides 820a, 820b having different heights (z-direction) from the media-facing surface. A dielectric slit 824 covers a top edge of the NFT 820 and provides feedback control. In this example, the dielectric slit only abuts one internal surface 822a of the aperture 822, and may end at or extend to the opposing edge 822b. The slit material could be same as or different from the core. The asymmetry in the two opposing sides of the NFT forms a cavity. Light gets reflected when propagating through either of two sides 820a, 820b. Due to the asymmetry, there is a phase difference between the two reflections.

Figure 9:
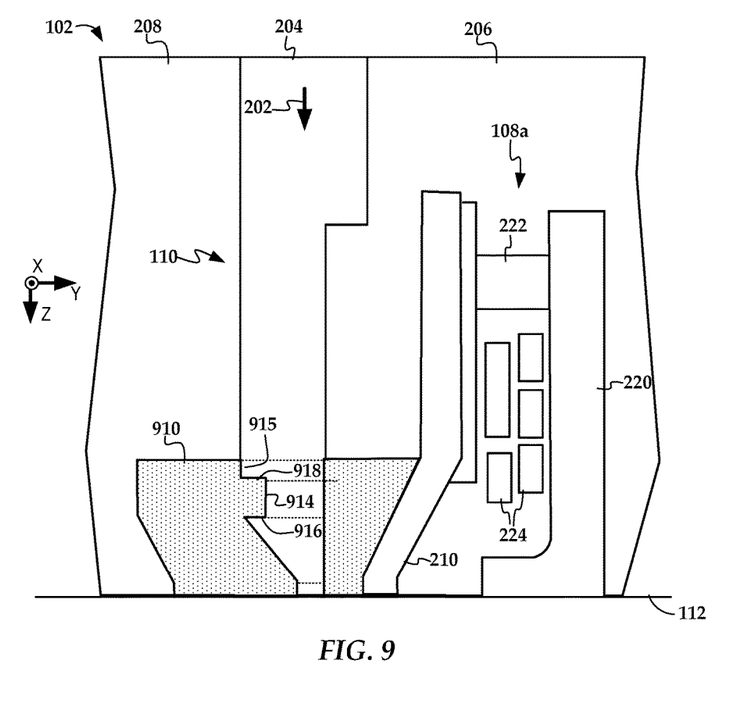

Another example embodiment is shown in the cross-sectional view of a recording head shown in FIG. 9. Shown at the media-facing surface 112 is a funnel NFT 910. The NFT 910 has a tapered aperture 912 surrounding by a plasmonic material (shaded regions). The aperture 812 may be filled with a core and/or cladding dielectric material. A ridge 914 extends into the aperture 912 from one internal wall 915 of the NFT 810. The ridge 914 results in two surfaces 916, 918 of the internal wall 915 being approximately parallel to the media-facing surface 112. Generally, the ridge 914 reduces feedback to a laser that energizes the NFT 910 via delivery waveguide 110. A similar internal wall ridge can be used with other NFT embodiments, e.g., gap NFT 500 shown in FIG. 5 and aperture NFTs shown in FIGS. 6 and 7.

Figure 10:
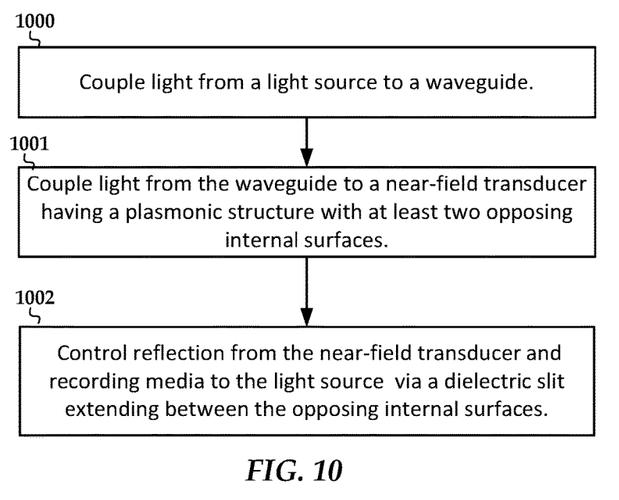
FIGS. 10 and 11 are flowcharts of methods according to example embodiments.

In FIG. 10, a flowchart shows a method according to an example embodiment. The method involves coupling 1000 light from a light source to a waveguide. The waveguide is configured to deliver the light to a media-facing surface of the recording head. The light is coupled 1001 from the waveguide to a near-field transducer at the media-facing surface the proximate the waveguide. The near-field transducer has a plasmonic structure with at least two opposing internal surfaces. A dielectric material fills a region between the at least two opposing internal surfaces. Reflection from the near-field transducer and storage media to the light source is controlled 1002 (e.g., increased or decreased) via a dielectric slit extending between the at least two opposing internal surfaces. The dielectric slit is substantially parallel to the media-facing surface and includes a transparent material with a refractive index different than that of the dielectric material.

Figure 11:
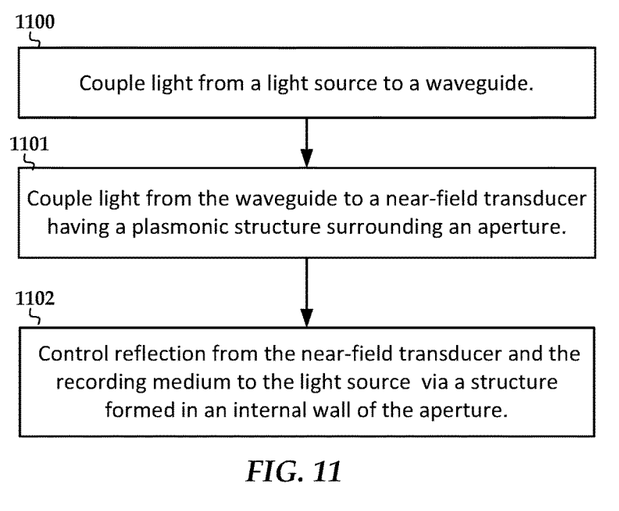

In FIG. 11, a flowchart shows a method according to an example embodiment. The method involves coupling 1100 light from a light source to a waveguide. The waveguide is configured to deliver the light to a media-facing surface of the recording head. The light is coupled 1101 from the light to a near-field transducer at the media-facing surface the proximate the waveguide. The near-field transducer has a plasmonic structure surrounding an aperture that is filled with a dielectric material. Reflection from the near-field transducer and storage media to the light source is controlled 1102 (e.g., increased or decreased) via a structure (e.g., cavity, ridge) on an internal wall of the aperture. The structure has two surfaces substantially parallel to the media-facing surface.

In summary, a feature (e.g., slit in a funnel or gap, plasmonic structure formed on an internal wall, asymmetric structure) of a near-field transducer is described that can be used to control optical feedback, thereby improving laser stability. The feedback could be eliminated such that the lasing mode is stabilized with a back and front facet coating, or could be intensified such that the laser operates in an external cavity mode with an anti-reflective coating on the front facet of the diode. There is little penalty in the optical performance for recording.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
   a waveguide configured to deliver light from a light source to a media-facing surface of the recording head;
   a near-field transducer at the media-facing surface the proximate the waveguide, the near-field transducer comprising a plasmonic structure with at least two opposing internal surfaces, a dielectric material filling a region between the at least two opposing internal surfaces; and
   a dielectric slit extending between the at least two opposing internal surfaces, the dielectric slit substantially parallel to the media-facing surface and comprising a transparent material with a refractive index different than that of the dielectric material.

2. The recording head of claim 1, wherein the dielectric slit reduces feedback of the light to the light source.

3. The recording head of claim 2, wherein an input surface of the slider proximate the light source is anti-reflection coated.

4. The recording head of claim 1, wherein the dielectric slit increases feedback of the light to the light source, causing the light source to operate in an external cavity mode.

5. The recording head of claim 4, wherein a front facet of the light source and an input surface of the slider comprise an anti-reflective coating.

6. The recording head of claim 1, wherein the near-field transducer comprises an aperture extending from the waveguide to the media-facing surface, the at least two opposing sides comprising sides of the aperture.

7. The recording head of claim 6, wherein the aperture comprises a funnel shape that decreases in cross-sectional area towards the media facing surface.

8. The recording head of claim 6, wherein the aperture comprises one of an E-shape and a C-shape.

9. The recording head of claim 1, wherein the near-field transducer comprises two substrate-parallel plates with a gap therebetween, the at least two opposing sides comprising edges of the plates that form the gap.

10. The recording head of claim 1, wherein the dielectric material comprises a core material of the waveguide, and wherein the refractive index of the dielectric slit is less than that of the core material.

11. A recording head comprising:
a waveguide configured to deliver light from a light source to a media-facing surface of the recording head;
a near-field transducer at the media-facing surface the proximate the waveguide, the near-field transducer comprising a plasmonic structure surrounding an aperture that is filled with a dielectric material, an internal wall of the aperture comprising a structure with two surfaces substantially parallel to the media-facing surface, the structure controlling reflection of the light back to the light source.

12. The recording head of claim 11, wherein the structure reduces the feedback.

13. The recording head of claim 11, wherein the structure increases the feedback, causing the light source to operate in an external cavity mode.

14. The recording head of claim 11, wherein the structure comprises a ridge extends from the internal wall into the aperture.

15. The recording head of claim 11, wherein the structure comprises a cavity extends into the internal wall and results in a local increase in a width of the aperture.

16. The recording head of claim 11, wherein the aperture comprises a funnel shape that decreases in cross-sectional area towards the media facing surface.

17. The recording head of claim 11, where the near-field transducer is asymmetric with the two opposing sides having different height from the media-facing surface.

18. A recording head, comprising:
a waveguide configured to deliver light from a light source to a media-facing surface of the recording head;
a near-field transducer at the media-facing surface the proximate the waveguide, the near-field transducer comprising a plasmonic structure surrounding an aperture, a dielectric material filling the aperture; and
a dielectric slit extending between at least two opposing internal surfaces of the aperture, the dielectric slit substantially parallel to the media-facing surface and comprising a transparent material with a refractive index different than that of the dielectric material, the dielectric slit reducing feedback of the light to the light source.

19. The recording head of claim 18, wherein the aperture comprises a tunnel shape that decreases in cross-sectional area towards the media facing surface.

20. The recording head of claim 1, wherein the dielectric material comprises a core material of the waveguide, and wherein the refractive index of the dielectric slit is less than that of the core material.

* * * * *